United States Patent Office 3,389,475
Patented June 25, 1968

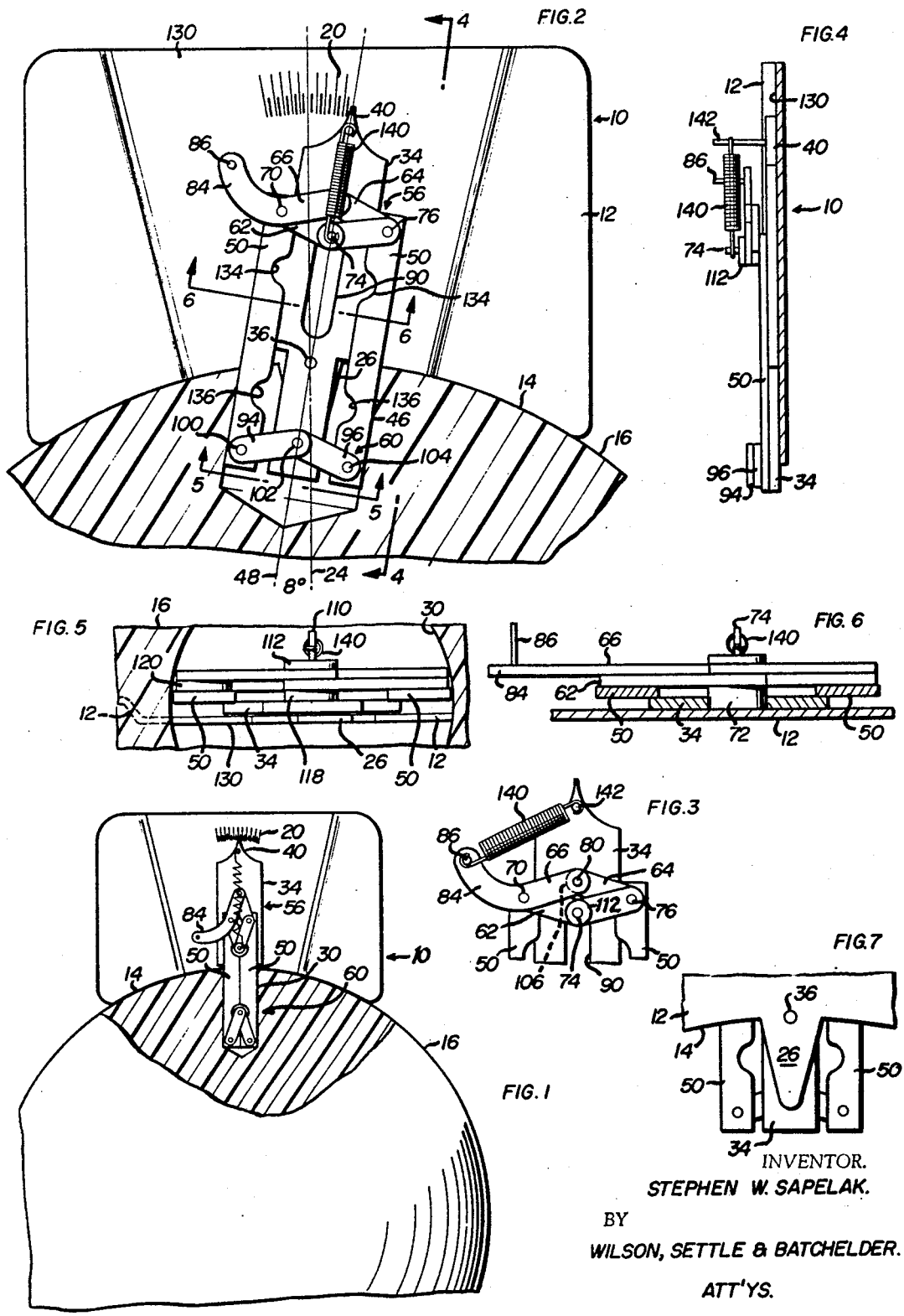

3,389,475
GAUGE FOR MEASURING PITCHES OF
HOLES IN BOWLING BALLS
Stephen W. Sapelak, 602 Westbrook Ave.,
Pontiac, Mich. 48058
Filed June 26, 1967, Ser. No. 648,786
5 Claims. (Cl. 33—174)

ABSTRACT OF THE DISCLOSURE

A gauge is provided for accurately measuring the pitch in a bowling ball wherein an indicator is pivoted at the arcuate surface of the ball and includes opposed gauge bars arranged with parallel sides for engagement with the ball in its hole regardless of the diameter and depth of the hole.

Summary of the invention

In accordance with my invention I provide a gauge for measuring the pitch in a bowling ball which includes a plate having an edge with the curvature to match the curvature of the outer surface of a bowling ball with the plate having graduations thereon and an offset portion in the central portion thereof and an extension to be received in the ball. An indicator is pivotally mounted on said extension and in said offset portion for accurately gauging the angle of the hole. A pair of opposed gauge bars are carried by the indicator and have edges arranged in parallel relationship with each other with pivotally connected link members accurately controlling the movement of the gauge bars to maintain their edges in parallel relation regardless of the depth or diameter of the hole. The gauge bars are positioned in the offset portion on the same plane as the main portion of the plate so as to be in direct line with the plate for accurately gauging the pitch of the hole in the ball.

When the desired pitch is determined on a test or other ball the hole may be measured and duplicated on a new ball.

It is therefore an object of my invention to provide a new and improved gauge for accurately measuring the pitch of a hole in a bowling ball wherein an indicator is pivoted at the right location and carries gauge bars at the proper position and serves as a base for linkage for controlling the movement of the gauge bars and their relationship with each other regardless of the size or depth of the hole.

Other objects of this invention will appear in the following description and appended claims reference being had to the accompanying drawings forming a part of this specification wherein like reference characters designate corresponding parts in the several views.

In the drawings:

FIGURE 1 is a side view in elevation of the gauge embodying features of my invention and shown mounted on a bowling ball with the gauge in closed position;

FIGURE 2 is a view of the gauge mounted on a bowling ball with the gauge being in open position;

FIGURE 3 is a fragmentary view of the gauge shown in FIGURE 2 with the spring mounted in a modified arrangement;

FIGURE 4 is an enlarged view of the gauge taken along the line 4—4 of FIGURE 2 in the direction of the arrows;

FIGURE 5 is an enlarged view taken along the line 5—5 of FIGURE 2;

FIGURE 6 is an enlarged view taken along the line 6—6 of FIGURE 2; and

FIGURE 7 is a fragmentary view in elevation of the lower portion of the gauge showing the opposite side from that disclosed in FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a gauge for measuring the pitch of a hole in a bowling ball. The gauge 10 includes a plate 12 having a concave inner edge 14 formed on the arc of a circle to fit the outer surface of a ball 16. The plate 12 is provided with graduations 20 on each side of a vertical center line 24 of the ball 16. With this arrangement the pitch of the hole in the ball may be read on either side of the center line 24. The plate 12 includes an extension 26 which extends into the hole or bore 30 of the ball 16. An indicator 34 is pivotally mounted on the extension 26 by pivot pin 36 with the axis of the pin being at the arc formed by the inner edge 14 of the plate 12 and at the outer surface of the ball to provide for accuracy in measuring the ball.

The indicator 34 includes a pointer 40 which is located along the longitudinal center of the indicator 34 to indicate the degree of the pitch of the bore in degrees.

In FIGURE 1 the indicator 34 and the parts carried thereby are shown in a closed position in a small hole 30 with its longitudinal axis being on the line of the vertical center line 24 of the ball 16. In FIGURE 2 the indicator 34 and the parts carried thereby are shown in an open position in a larger hole 46 and on an angle of 80° from the center line 24 as shown by line 48, the center line of the indicator and line 24. The gauge is operative in bores or holes of less than 9/16 of an inch to more than 1¼ inches in diameter. The long lines of the graduations are spaced 1°40′ apart and the shorter lines are one half the distance between the shorter lines and the longer lines. Any indicating figures desired may be entered on the plate 12 for accurate measurement.

The indicator carries a pair of gauge bars 50 which extend longitudinally of the indicator 34 in parallel relationship with each other with the outer edges thereof remaining in parallel relationship regardless of the pitch or the size of the hole being measured and likewise regardless whether the gauge is partially or entirely open or closed.

The gauge bars 50 are carried on the indicator 34 by an upper linkage 56 and a lower linkage 60. The upper linkage includes links 62, 64, 66 and 68. The lower link 62 is pivoted on the bar 50 by pin 70 on one end and pivoted on a guide pin 72 by pivot pin 74. The lower link 64 is pivoted on the opposite bar 50 by pin 76 on one end and the other end is pivoted on the indicator 34 by pin 80. The upper bar 66 includes a handle portion 84 having a holding pin 86 and is pivoted on one end of indicator 34, pin 80, above link 64 and pivoted on its other end on pin 70 on bar 50. The link 68 is pivoted on one end on guide pin 72 and pivoted on the other end on pin 76 on bar 50. The guide pin 72 is positioned in a longitudinally extending slot 90 in the indicator 34.

The lower linkage 60 includes links 94 and 96. The link 94 is positioned above the link 96 and has one end pivoted on pin 100 on bar 50 and the other end is pivoted on pin 102 on indicator 34. The under link 96 is pivoted on one end on pin 102 on indicator and the end on pin 104 on the opposite bar 50.

The upper linkage pin 80 is stationary on the indicator 34 and has a spacer 106 between the indicator and link 64 to retain the link parallel with the indicator. The guide pin 72 has the outer smaller portion 74 which carries a disc 112 which retains the ends of the links to the portion of pin 72 positioned in the slot 90. The larger portion of the pin 72 is arranged in close slidable arrangement with the walls of the slot 90.

The lower linkage pin 102 is stationary and carries a spacer 118 between link 96 and the indicator 34 to keep link 94 parallel with the indicator 34 and pivot pin 100 carries a spacer 120 between link 94 and bar 50 to keep link 94 parallel with link 96.

The plate 12 is provided with an offset portion 130 in which the indicator 34 is positioned for pivotal movement. By reason of the indicator, the spacers and links the parallel gauge bars are on the same plane as the main portion of the plate 12 which is on each side of the offset portion 130. Thus the bars 50 will extend across the center of the hole the same as the main body of plate 12 for an accurate measurement. The bars 50 are notched at 134 and 136 to extend around the guide pin 72 and pivot pin 102 when the gauge is closed as shown in FIGURE 1.

A spring 140 is secured on one end on a pin 142 on indicator 34 and secured on the other end on guide pin 72, portion 74, to hold the gauge open when not in use and to hold the bars 50 against the walls of the hole when measuring. As shown in FIGURE 3 the spring 140 may be secured on one end on pin 142 and the other end on pin 86 on the handle portion 84. In either position the spring 140 serves the same purpose.

To move the gauge from open to partially or entirely closed position the handle portion 84 is moved downwardly as viewed in the drawing. This causes the guide pin 72 to move downward in the longitudinal slot 90. When the handle is moved upwardly the guide pin 72 moves upward in slot 90. The accuracy of the links, pivot pins and bars 50 determines the accuracy of the gauge. These parts are designed so that the linkage causes the bars 50 to move away from or toward each other with the outer edges of the bars remaining in true parallel relationship.

The gauge is so arranged that it may be used with full, semi-finger tip or regulation bores in the balls. Due to the fact that portions of the bars 50 and linkage extend on opposite sides of the edge 14 the gauge will operate successfully on any depth bore or hole in the ball because the bars remain in their original parallel position regardless of the depth of the hole.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A gauge for measuring the pitch of a hole in a bowling ball with respect to the radius of the ball wherein the improvement comprises a plate having a concave inner edge formed on the arc of a circle to fit the outer surface of the ball, one face of said plate having graduations thereon, an indicator pivotally supported on said plate at the inner edge of said plate and having a portion extending beyond said edge to be received in said ball, opposed gauge bars having edges arranged in parallel relationship with each other and extending longitudinally along said indicator, and means for controlling the movement of both of said gauge bars to maintain their original parallel relationship for engagement with the ball in its hole and said plate has an offset portion between the ends of the main portion of the plate and the indicator being pivotally mounted on the offset portion with the parallel gauge bars being movably carried by the indicator on substantially the same plane as the main portion of the plate.

2. A gauge for measuring the pitch of a hole in a bowling ball with respect to the radius of the ball wherein the improvement comprises a plate having a concave inner edge formed on the arc of a circle to fit the outer surface of the ball, one face of said plate having graduations thereon, an indicator pivotally supported on said plate at the inner edge of said plate and having a portion extending beyond said edge to be received in said ball, opposed gauge bars having edges arranged in parallel relationship with each other and extending longitudinally along said indicator, and means for controlling the movement of both of said gauge bars to maintain their original parallel relationship for engagement with the ball in its hole and the indicator is provided with a longitudinally extending slot and the means includes linkage having a guide pin movable in said slot to centralize the movement of the linkage and said gauge bars.

3. A gauge as defined in claim 2 wherein the linkage is positioned on one end of the indicator and a second linkage is pivoted on the opposite end of the indicator with axis of the guide pin being the same distance from the parallel gauge bars as the axis of the pivot point on the opposite end of the indicator.

4. A gauge as defined in claim 3 wherein the linkage on one end of the indicator includes four links with the ends of two links being pivotally mounted on one gauge bar and the opposite end of one link being pivotally mouted on the indicator and the opposite end of the other link being pivotally mounted on said guide pin and the other two of the four links being mounted on the opposite gauge bar and said indicator and guide pin respectively and the linking at the other end of the indicator includes two links with one end of each being pivotally mounted on the indicator and the other end of each being pivotally mounted with one on one gauge bar and the other end on the other gauge bar.

5. A gauge as defined in claim 4 wherein resilient means is attached to said indicator and one of said linkages to retain the gauge bars in open separated position when the bars are not in engagement with a ball.

References Cited

UNITED STATES PATENTS

| | | | |
|---|---|---|---|
| 2,706,338 | 4/1955 | Ackerman et al. | 33—174 |
| 2,714,256 | 8/1955 | Watson | 33—174 |
| 3,206,858 | 9/1965 | Bernard | 33—174 |
| 3,308,549 | 3/1967 | Porter | 33—205 |

SAMUEL S. MATTHEWS, *Primary Examiner.*